United States Patent [19]

Nosenchuck

[11] Patent Number: 5,442,790
[45] Date of Patent: Aug. 15, 1995

[54] OPTIMIZING COMPILER FOR COMPUTERS

[75] Inventor: Daniel M. Nosenchuck, Mercerville, N.J.

[73] Assignee: The Trustees of Princeton University, Princeton, N.J.

[21] Appl. No.: 208,488

[22] Filed: Mar. 9, 1994

Related U.S. Application Data

[63] Continuation of Ser. No. 705,331, May 24, 1991, abandoned.

[51] Int. Cl.[6] .............................................. G06F 9/45
[52] U.S. Cl. ............................ 395/700; 364/DIG. 1; 364/280.4; 364/280.5; 364/264.3
[58] Field of Search ...................................... 395/700

[56] References Cited

U.S. PATENT DOCUMENTS

4,811,214  3/1989  Nosenchuck et al. .............. 364/200
5,151,991  9/1992  Iwasawa et al. ..................... 395/700

OTHER PUBLICATIONS

The Effect of Restructuring Compilers on Program Performance for High-Speed Computers, Cytrol et al., Comp. Physics Comm., 1985, pp. 39–48.

Experiments in Optimizing FP: Ryder et al., IEEE Trans. on Software Engg., vol. 14, No. 4, Apr. 1988, pp. 444–454.

P. B. Schneck et al., "An Optimizing Compiler", Sep. 1972, The Computer Journal, pp. 322–330.

David J. Kuck et al., "Measurements of Parallelism in Ordinary Fortran Programs" Jan. 1974, The Computer Journal pp. 37–46.

Joseph A. Fisher, Student Member, IEEE, "Trace Scheduling: A Technique for Global Microcode Compaction" IEEE Transactions on Computers, vol. 30 Jul. 1981 pp. 478–490. No. 7.

Joseph A. Fisher, Yale University, "The VLIW Machine: A Multiprocessor for Compiling Scientific Code" 1984 IEEE pp. 45–53, Jul.

Rajiv Gupta et al. "Compliation Techniques for a Reconfigurable LIW Architecture" The Journal of Supercomputing 3, pp. 271–304 1989.

Pei-Zong Lee et al. "Mapping Nested Loop Algorithms into Multidimensional Systolic Arrays" IEEE Transactions on Parallel and Distributed Systems Jan. 1990 pp. 64–76 vol. 1. No. 1.

Primary Examiner—Kevin A. Kriess
Assistant Examiner—Kakali Chaki
Attorney, Agent, or Firm—Perman & Green

[57] ABSTRACT

A method is described for compiling a source code listing into an object code listing and comprises the steps of: extracting a block of source code statements from a source code listings; mapping each source code statement in the block into a wide intermediate code (WIC) statement in object form, a WIC statement defining a series of machine actions to perform the function(s) called for by the source code statement; performing an initial approximate simulation of each WIC statement in a block and deriving performance results from the simulation of each WIC statement and the block of WIC statements; dependent upon the performance results, revising the WIC statements in the block in accordance with one of a group of code transform algorithms and heuristics in an attempt to improve the code's performance results; and repeating the approximate simulation to determine if the performance results have been improved and, if so, proceeding to another of the algorithms to enable further revision of the WIC statements, until a decision point is reached, and at such time, producing the revised WIC statements in object code form.

11 Claims, 8 Drawing Sheets

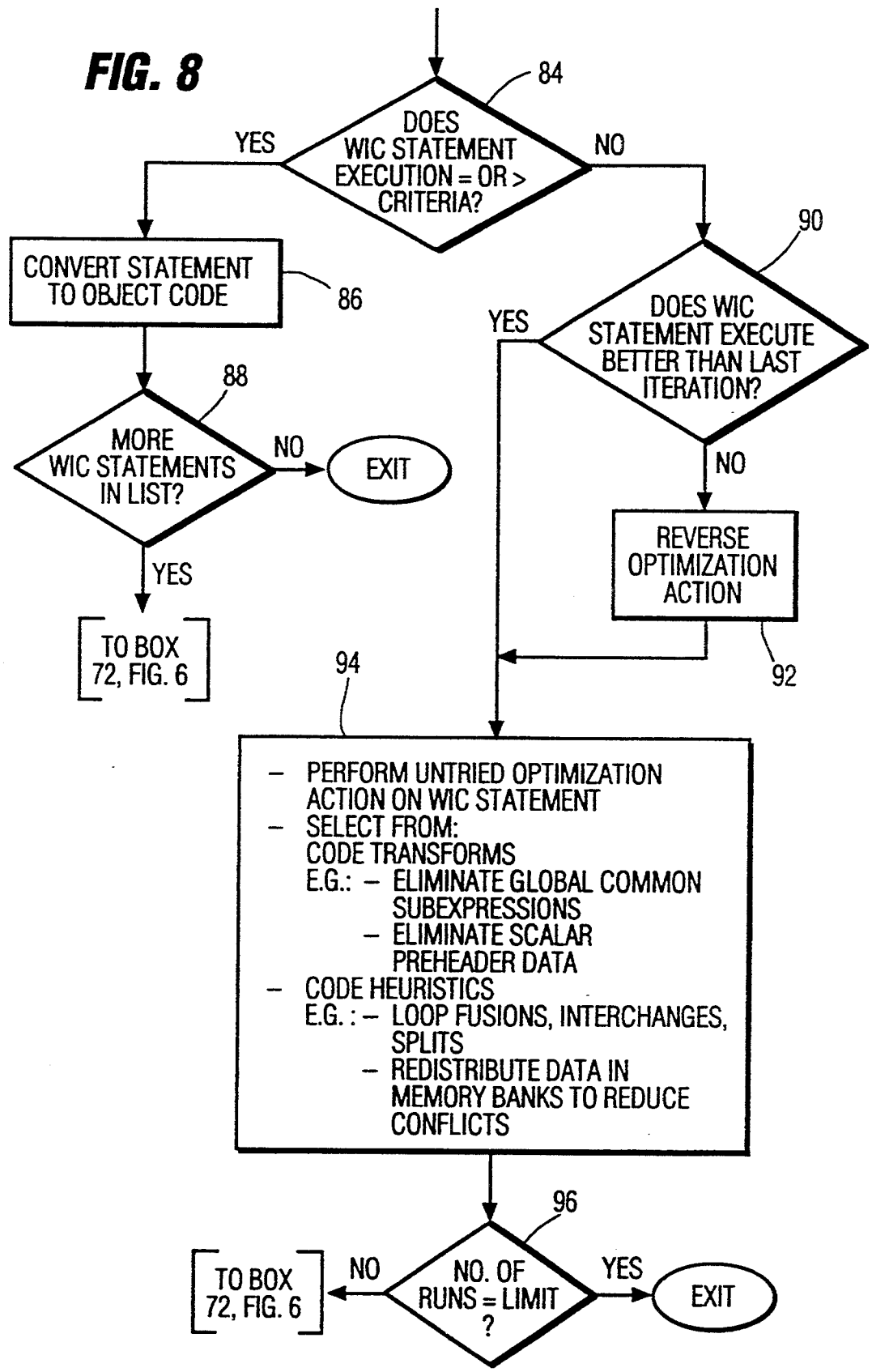

OPTIMIZING COMPILER FOR COMPUTERS

This is a continuation of application Ser. No. 07/705,331 filed on May 24, 1991 now abandoned.

FIELD OF THE INVENTION

This invention relates to source code compilers, and, more particularly, to a system for transforming source code to an intermediate code and, on-the-fly, reconfiguring the intermediate code to optimize its performance before it is transformed into object code.

BACKGROUND OF THE INVENTION

A compiler is a program containing multiple routines for translating source code into machine (object) code. In general, compilers take a high level source language (e.g., C, Fortran, etc.) and translate it into a sequential, intermediate format code. A dependency analysis is performed on the intermediate code statements. That analysis determines which operands are required to produce a given result and allows those operands to be available in the correct sequence and at the correct time during the processing operation. Subsequently, the compiler goes through a general optimizing routine which transforms the intermediate code statements into a subsidiary intermediate foam characterized by a more compact format. For instance, "dead" code is removed, common subexpressions are eliminated, and other compaction techniques are performed. These optimization actions are essentially open loop, in that the code is subjected to a procedure and is then passed on to a next optimization procedure without there being any intermediate testing to determine the effectiveness of the optimization. Subsequently, the optimized code statements are converted into machine language (object code). In general, such compiled code is directly run and is not subjected to a performance metric to determine the efficiency of the resulting object code.

In summary, compiler optimization procedures are basically open loop, in that they select individual statements in the intermediate code string and pass those statements through a list of optimization procedures. Once the procedures have been completed, the code is converted to object code and is not subjected to a further performance measure.

Recently, with the advent of highly parallel computers, compilation tasks have become more complex. Today, the compiler needs to assure both efficient storage of data in memory and for subsequent availability of that data from memory, on a nearly conflict-free basis, by the parallel processing hardware. Compilers must therefore address the fundamental problem of datastructure storage and retrieval from the memory subsystems with the same degree of care associated with identification and formation of vector/parallel code constructs.

Vector processors and systolic arrays are of little use if the data becomes enmeshed in traffic jams at both ends of the units. In order to achieve nearly conflict-free access, it is not sufficient to run intermediate code through an optimization procedure and "hope" that its performance characteristics have been improved. Furthermore, it is inefficient to fully compile/optimize a complex source code listing and then be required to compare the resulting object code's performance against performance metrics, before determining whether additional code transformations are required to achieve a desired performance level.

The prior art regarding compiler optimization is characterized by the following articles which have appeared over the years. Schneck et al. in "Fortran to Fortran Optimizing Compiler", The Computer Journal, Vol. 16, No. 4, pp. 322–330 (1972) describe an early optimizer directed at improving program performance at the source code level, rather than at the machine code level. In 1974, Kuck et al. in "Measurements of Parallelism in Ordinary Fortran Programs", Computer January 1974, pp. 37–46 describe some early efforts at extracting from one program, as many simultaneously executable operations as possible. The purpose of that action was to improve the performance of a Fortran program by enabling certain of its operations to run in parallel.

An optimization procedure for conversion of sequential microcode to parallel or horizontal microcode is described by Fisher in "Trace Scheduling: A Technique for Global Microcode Compaction", IEEE Transactions on Computers, Vol. C-30, No. 7, July 1981, pp. 478–490.

Heavily parallel multiprocessors and compilation techniques therefor are considered by Fisher, in "The VLIW Machine: A Multiprocessor for Compiling Scientific Code" Computer, July 1984, pp. 45–53 and by Gupta et al. in "Compilation Techniques for a Reconfigurable LIW Architecture", The Journal of Supercomputing, Vol. 3, pp. 271–304 (1989). Both Fisher and Gupta et al. treat the problems of optimization in highly parallel architectures wherein very long instruction words are employed. Gupta et al. describe compilation techniques such as region scheduling, generational code for reconfiguration of the system, and memory allocation techniques to achieve improved performance. In that regard, Lee et al. in "Mapping Nesting Loop Algorithms into Multidimensional Systolic Arrays", IEEE Transactions on Parallel and Distributed Systems, Vol. 1, No. 1, January 1990, pp. 64–76 describe how, as part of a compilation procedure, loop algorithms can be mapped onto systolic VLSI arrays.

The above-cited prior art describes open-loop optimization procedures. In specific, once the code is "optimized", it is converted into object code and then outputted for machine execution.

Accordingly, it is an object of this invention to provide an improved system for compiling source code, wherein optimization procedures are employed.

It is another object of this invention to provide an improved compiler wherein code transformed during an optimization procedure is immediately tested to determine if the conversion has improved its performance.

It is another object of this invention to provide a compiler that effectively enables allocation of data structures to one or more independent memory spaces (domain decomposition) to permit parallel computation with minimum subsequent memory conflicts.

SUMMARY OF THE INVENTION

A method is described for compiling a source code listing into an object code listing and comprises the steps of: extracting a block of source code statements from a source code listing; mapping each source code statement in the block into a wide intermediate code (WIC) statement in object form, a WIC statement defining a series of machine actions to perform the function(s) called for by the source code statement; performing an initial approximate simulation of each WIC statement in a block and deriving performance results from the simulation of each WIC statement and the block of WIC statements; dependent upon the performance results, revising the WIC statements in the block in accordance with one of a group of code transform algorithms and heuristics in an attempt to improve the code's performance; and repeating the approximate simulation to determine if the performance results have been improved and, if so, proceeding to another of the algorithms to enable further revision of the WIC statements, until a decision point is reached, and at such time, producing the revised WIC statements in object code form.

DESCRIPTION OF THE DRAWINGS

FIGS. 5–8 illustrate a high level flow diagram of the method of the invention.

DETAILED DESCRIPTION OF THE INVENTION

Prior to describing the details of the method of the compiler invention disclosed herein, the structure of a computer particularly adapted to execute the method will be first considered. Details of the to-be-described computer are disclosed in U.S. Pat. No. 4,811,214 to Nosenchuck et al. and assigned to the same Assignee as this application. The disclosure of the '214 patent is incorporated herein by reference.

In the '214 patent, a highly parallel computer is described which employs a small number of powerful nodes, operating concurrently. Within any given node, the computer uses many functional units (e.g., floating point arithmetic processors, integer arithmetic/logic processors, special purpose processors, etc.), organized in a synchronous, dynamically-reconfigurable pipeline such that most, if not all, of the functional units are active during each clock cycle of a given node.

Figure 1:
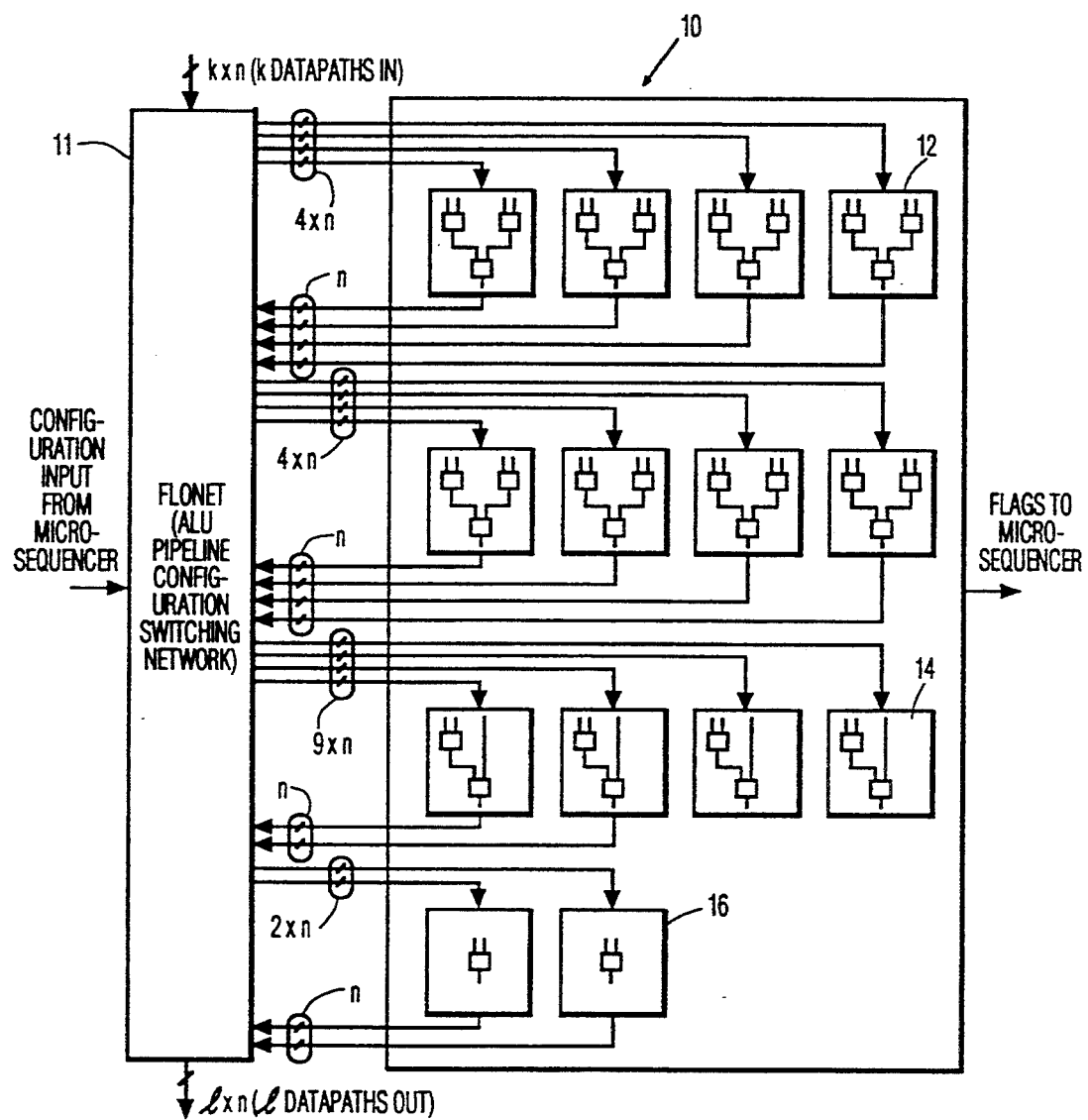
FIG. 1 is a partial block diagram of a prior art arithmetic-logic unit pipeline organization and switching network which allows for a change in the configuration of substructures making up the arithmetic-logic unit.

Each node of the computer includes a reconfigurable arithmetic/logic unit (ALU), a multiplane memory and a memory-ALU network switch for routing data between memory planes and the reconfigurable ALU. In FIG. 1, a high level block diagram shows a typical ALU pipeline switching network along with a plurality of reconfigurable substructures which may be organized to provide a specifically-called-for pipeline processing structure. Each reconfigurable pipeline processor 10 is formed of various classes of processing elements (or substructures) and a switching network 11. Three permanently hardwired substructures 12, 14, and 16 are each replicated a specific number of times in an ALU pipeline processor and are adapted to have their relative interconnections altered by switching network 11.

Figure 2:
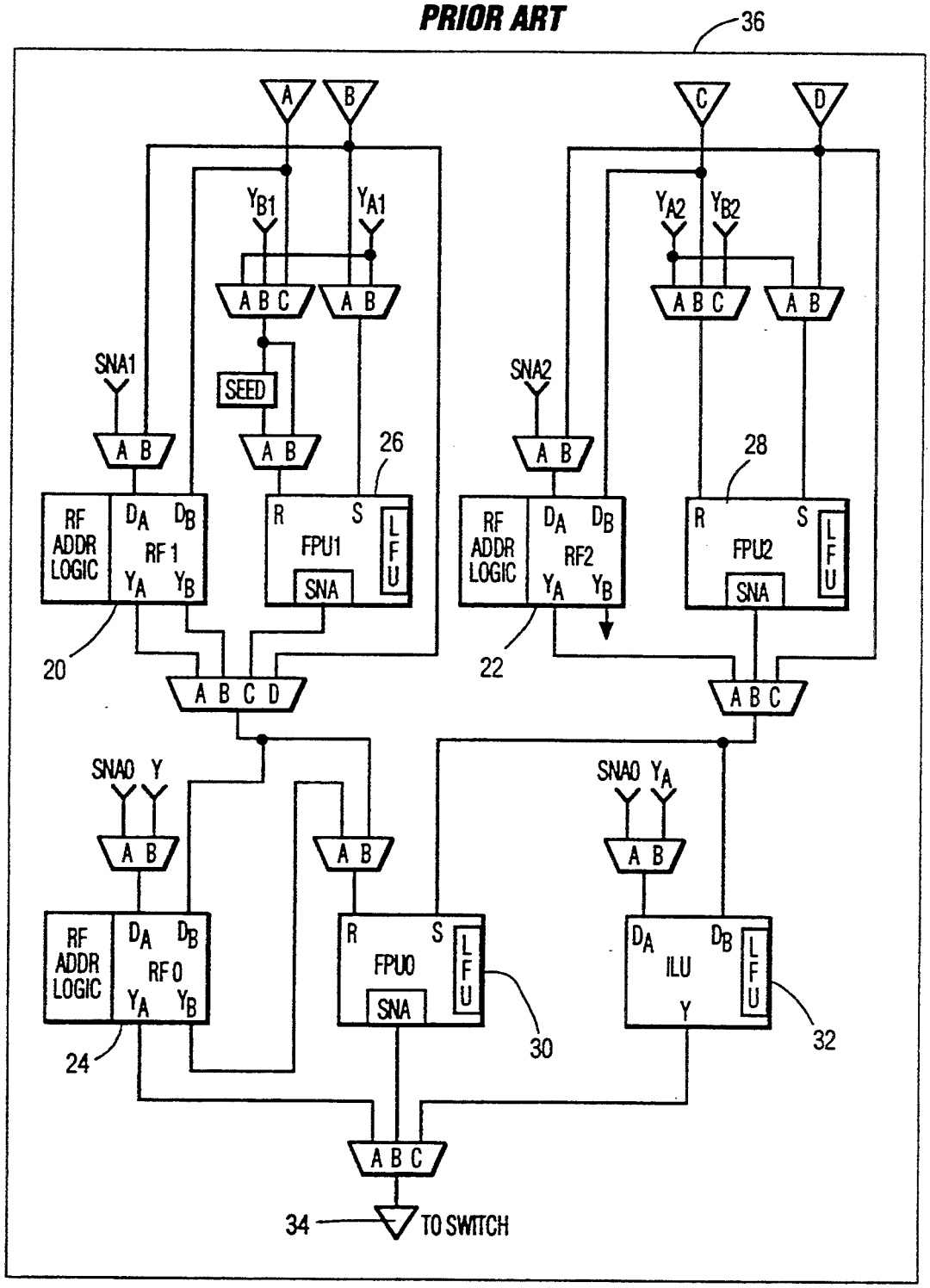
FIG. 2 is a block diagram of a "triplet" processing substructure which is employed in the system of FIG. 1.

Substructure 12 is illustrated in further detail, at the block diagram level in FIG. 2 and will hereafter be called a triplet. Each triplet contains three register files 20, 22, and 24; three floating point units 26, 28, and 30; and one integer logical unit 32. There are four inputs to the triplet, two each to the register file-floating point unit pairs. (e.g., 20, 26 and 22, 28). There is a single output 34. Inputs to the triplets pass through switch 11 (FIG. 1) but may come from memory or the output of another arithmetic/logic structure. Outputs from each triplet go to switch 11 from where they may be directed to the input of another arithmetic/logic structure or to memory.

Figure 3:
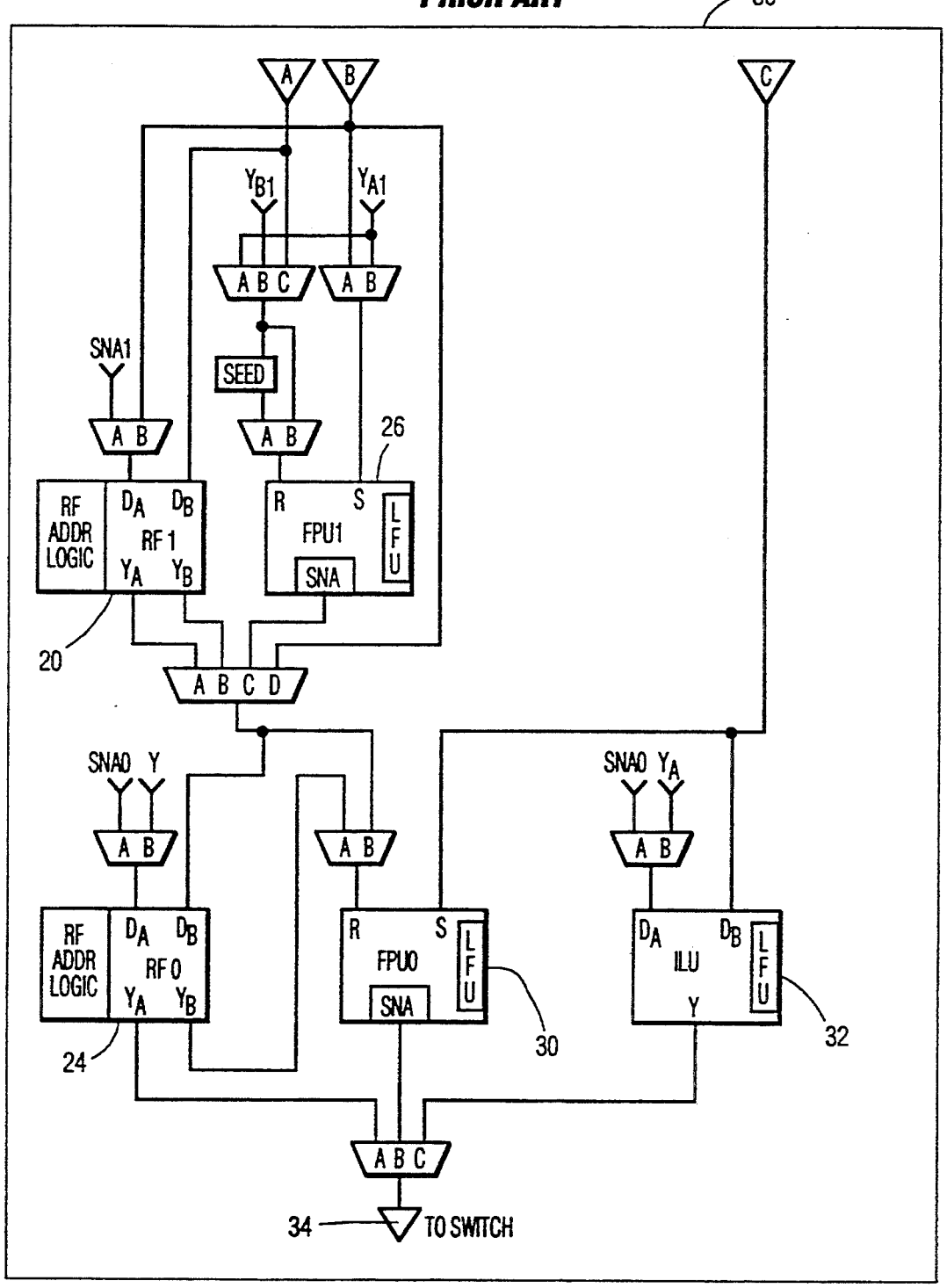
FIG. 3 is a block diagram of a "doublet" processing substructure employed in the system of FIG. 1.
Figure 4:
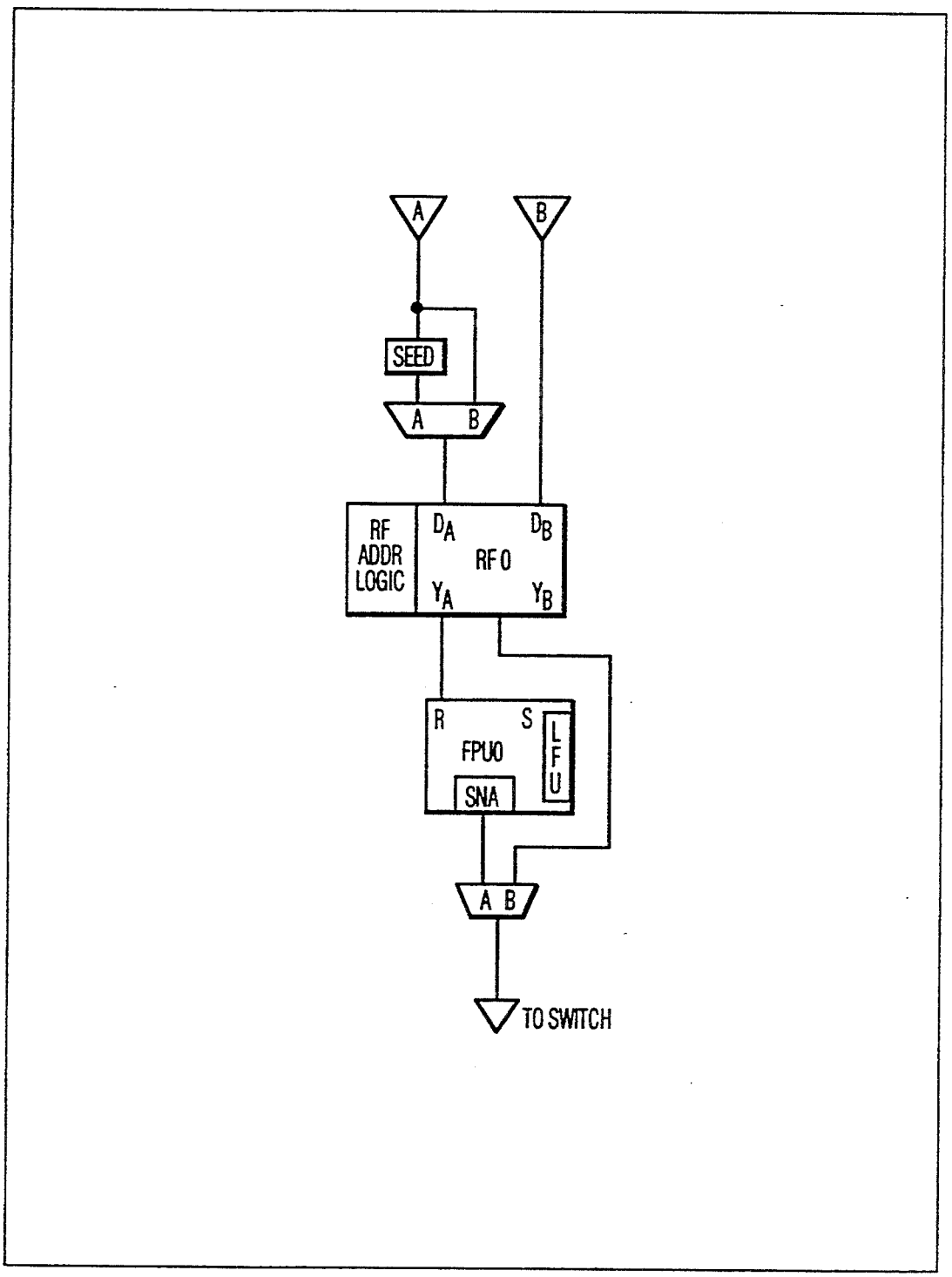
FIG. 4 is a block diagram of a "singlet" processing substructure employed in the system of FIG. 1.

Other processing substructures are shown in FIGS. 3 and 4, with FIG. 3 illustrating a doublet substructure 36 and FIG. 4 illustrating a singlet substructure 38. It can be seen that each of the aforesaid substructures is a subset of the triplet structure shown in FIG. 2 and accommodates one less input each.

The computer described in the '214 patent operates with a very-long instruction word (VLIW) having hundreds of fields. Portions of the fields of each VLIW define the processing structure required to be configured for each action of the computer. In effect, those portions of the VLIW commands create the reconfiguration of the system to enable the required processing functions to occur.

As above stated, the computer contains a substantial number of independent processors, each of which handles either an entire subroutine or a portion of a subroutine, in parallel with other processors. As a result, it can be seen that with the highly reconfigurable nature of each computer node in combination with the VLIW structure, great flexibility is available in the handling of processing of complex problems. However, along with this flexibility comes a cost, and that is the difficulty of assuring that the computer executes its code in the least expended time. The structuring of the system's object code is accomplished by a compiler which performs the method broadly shown in the flow diagrams of FIGS. 5–8.

Figure 5:
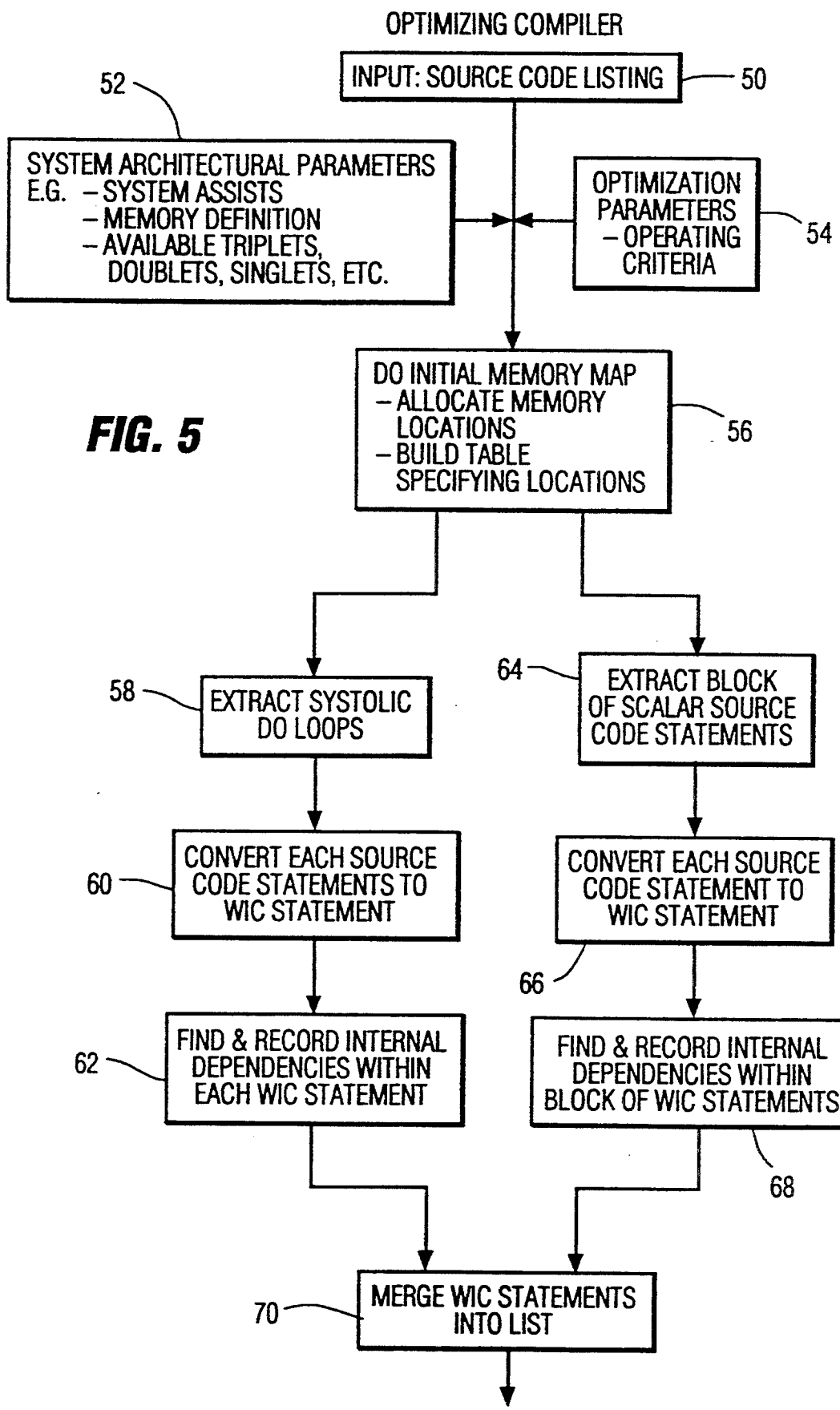
Figure 6:
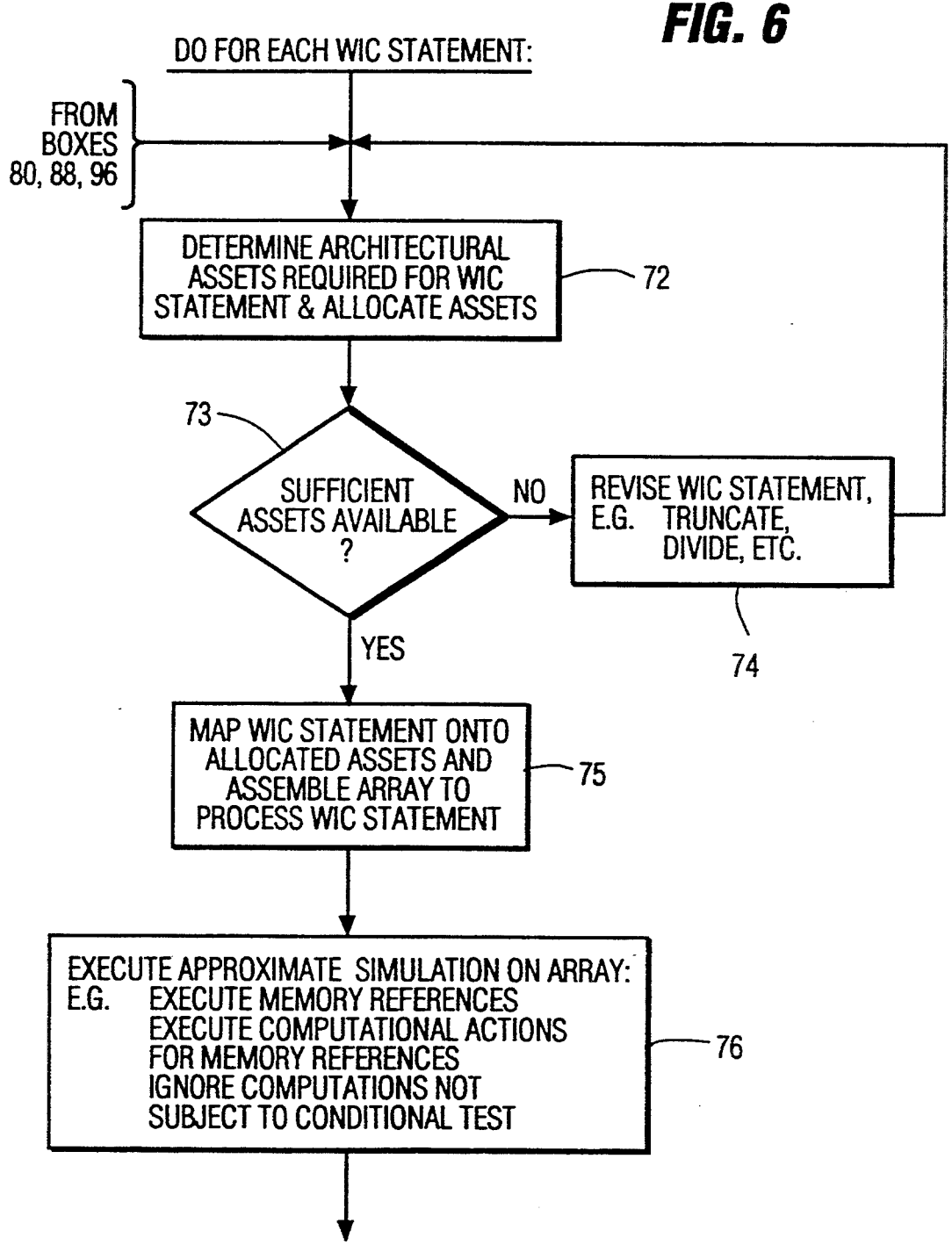
Figure 7:
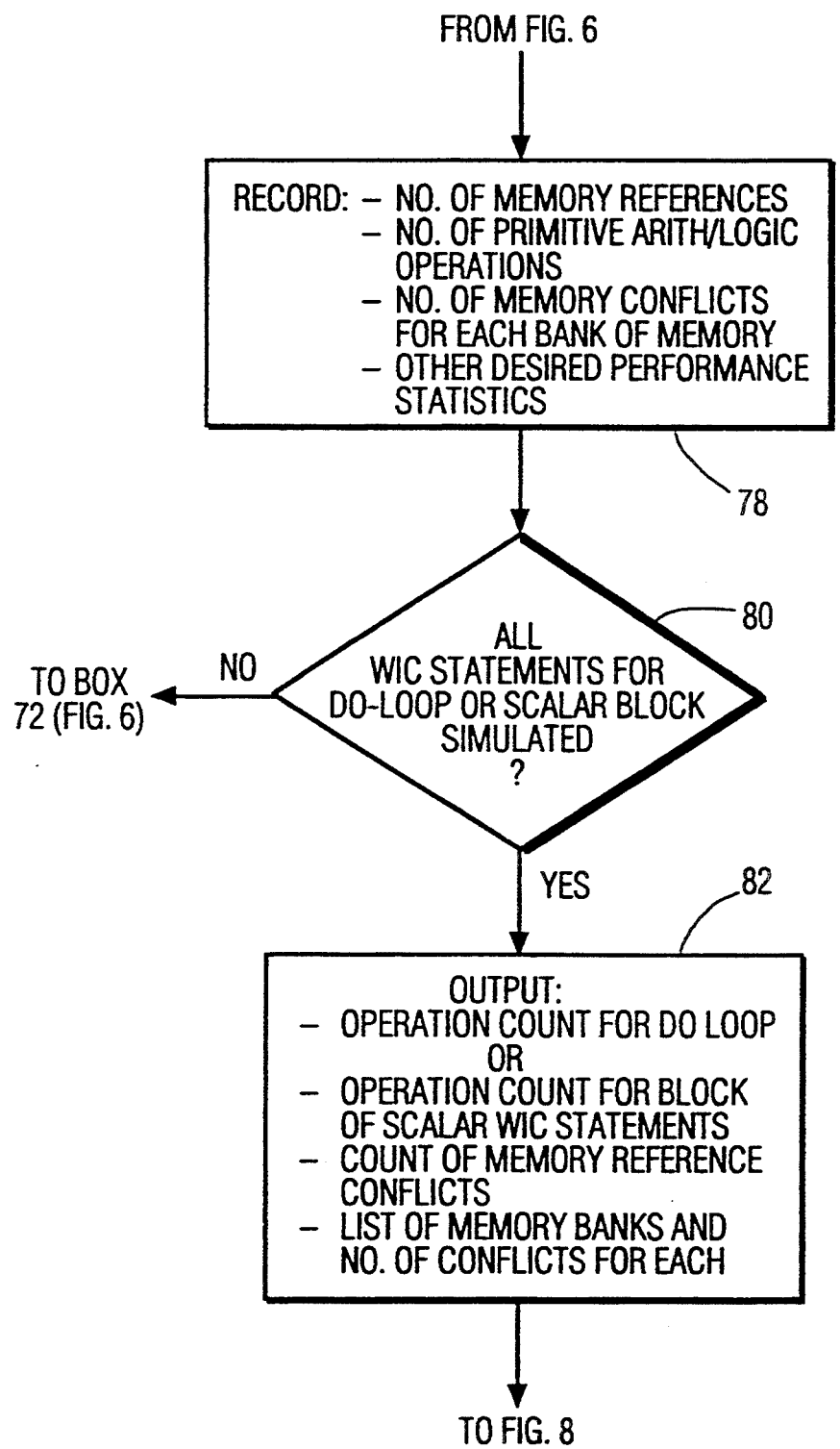

Referring now to the flow diagram in FIG. 5, the compiler receives as inputs, a source code listing (box 50) and data defining certain system and operating parameters. As shown in box 52, system architectural parameters form one input to the compiler and define, for each node, the available system assets and certain specifications with respect thereto. For instance, memory will be defined as to its organization (e.g. number of planes), whether they are physical or virtual, capacity of the cache, organization of the cache and its operating algorithm, number of reads per clock, writes per clock, and accesses per clock). Further, each processor will have defined for it the number of available singlets, doublets, and triplets (e.g., 4, 8, and 4 respectively), the number of register files and registers in each, the type of access, and whether any special functions are provided for in the processor. Clearly, additional architectural parameters will be provided, however the above provides one skilled in the art with a ready understanding of the type of information that defines system assets and their operating characteristics.

Optimization parameters are provided as inputs to the compiler (box 54) which, among other specifications, indicate the number of times the optimization subroutine should be traversed before a time-out occurs and an exit is commanded.

The source code listing is subjected to an initial memory map subroutine (box 56) which is comprised of a parser and lexical analyzer. These subroutines, along with a pre-optimization symbol-table generator, allocate memory locations of input memory arrays and build a table specifying those locations. More specifically, as source code statements are received which define array sizes, large arrays are allocated (decomposed) into differing physical locations (domains) in an early attempt to avoid subsequent memory reference conflicts.

It will be hereafter assumed that the source code listing includes both systolic do-loop statements as well as lists of scalar statements. Hereafter, the term "block" may either refer to a group of scalar statements or to those statements comprising a do-loop (e.g. a systolic code block). As is known, each do-loop is a vector process which defines an iterative operation to be performed on a set of operands. The compiler extracts the do-loops from the incoming source code input stream (box 58) and converts each source code statement therein to a Wide Intermediate Code (WIC) statement (box 60). The wide intermediate code differs from that generated by "conventional" vectorizing compilers, in that the format represents a higher level of specification than is typical with sequential code, with immediate local dependencies embodied within the WIC.

Each WIC statement defines a series of machine actions to perform the function called for by the source code statement. Each WIC statement is in object code form and comprises a chain of symbols, tokens, etc. which substantially define the actions called for by the source code statement. It is not executable by the computer at this stage as it lacks certain linking information.

In essence, the format of the WIC inherently maintains local parallel and systolic constructs and dependencies found in the original source code. The natural relationships between operand fetches, complex intermediate operations, and result storage are preserved within the WIC statements. A single line of WIC code often relates directly to corresponding lines in the source code. The burden on subsequent analysis to extract possible parallel or systolic implementations is lessened.

WIC may be contrast to ubiquitous sequential internal code-formats, typically characterized by simple load, move, operate, store sequences. This latter format places an increased burden on the parallel code analyzer which must reconstruct many of the "obvious" parallel code elements that were explicit in the original source code.

The WIC code embodies all of the actions directed by the source program. In addition, it maintains symbol-table attributes and local data dependencies.

An example of the basic format of a WIC statement is:

Result=(Oper 1⊙$_1$ Oper 2)⊙$_2$ (Oper 3⊙$_3$ Oper 4)

where ⊙ signifies an arbitrary high-level operation, such as =, −, ×, ÷, and Oper signifies an operand, either from memory, a register, or from the result of a preceding computation. In this example, the WIC shows the local dependencies (based on parenthetical ordering), where ⊙$_1$ and ⊙$_3$ may execute in parallel, with subsequent processing by ⊙$_2$. Systolic execution is operationally defined by considering data streams that enter an array of processing elements whose outputs are directly fed into subsequent processor inputs. Data is thus processed in an assembly line fashion, without the need for intermediate storage.

To illustrate an example of the format of the intermediate code, consider a systolic vector operation as extracted from a test program and expressed in Fortran as follows:

$$z = const1*b(j) - (const2*a(i) + const3*c(i,j))$$

The WIC statement corresponding to the above Fortran statement is as follows:

```
p00:=$8#11RS* $1#5MA1+$9#11RS*$4#8MA1 %
calculate
      c2*a(i)+c3*c(i,j)
==$13#12MA1--$7#11RS*$2#6MA1-p00   % calculate z
¯>     % end do
```

The dependency analyzer which creates the WIC above closely follows the format of the source-code. The WIC uses symbol-table mnemonics particular to this embodiment of the compiler. The potential for multiple independent memory planes is reflected in the structure of the token. The format of the data-structure symbol table tokens is described in Table 1.

Data-structure symbol-table tokens: $ ! xx #mp stor occ, where:

TABLE 1

| Format of Data-structure Symbol Tokens | |
|---|---|
| Symbol | Explanation |
| $ | data element |
| ! | Scatter/multistore indicator |
| xx | variable reference number |
| #mp | memory plane number |
| stor | disposition of variable given by: |
|  | MA: memory-based arrray |
|  | MS: memory-based scalar |
|  | RA: register-based delayed array |
|  | RS: register-based scalar |
| occ | variable occurrence number |

As shown in the above Example, a WIC is essentially comprised of nested interior dependency nodes (within a —loop). (The loop header code was eliminated for simplicity). Here nonterminal internal node p00 indicates a systolic phrase. The phrase-break is driven by the parenthetical ordering indicated in the source. The token bounded by == is the root of the local dependancy tree. Thus, as illustrated by this example, the WIC presents a natural ordering of intermediate and final results that lend themselves to relatively straight-forward subsequent analysis and parallel implementation.

The inherited attributes can be parsed much finer where, in the limit, conventional sequential intermediate code, as discussed above, would result. However, this would require increased work from the parallel code analyzer, and might result in lower parallel performance relative to that expected by WIC analysis. It should be noted that WIC ordering does not significantly constrain additional systolic and parallel code generation, which is performed by the optimizer.

Returning now to FIG. 5, after each do-loop WIC statement is constructed (box 60), internal dependencies within the statement are found and recorded. As can be seen from boxes 64, 66, and 68, similar acts occur with respect to blocks of scalar source code statements. In this instance however, the block size is the minimum of either the number of lines of code between successive do-loops, or a predefined maximum number of lines of code.

Once both the do-loops and blocks of scalar statements are converted to WIC statements, those statements are merged (box 70) into a list. Then, each WIC statement is analyzed to determine which architectural assets are required to enable it to function. Those assets are then allocated (box 72, FIG. 6), and the WIC statement is mapped onto the architectural units to produce the necessary systolic or scalar array that is able to process the statement (box 74).

At this stage, the compiler has generated a map which, in combination with the allocated architectural assets, enables configuration of a computational system to perform the WIC statement. However, if insufficient assets are available to simulate the WIC statement (see decision box 73), the WIC statement must be revised (box 73) to accomodate the available assets. This may take the form of a statement truncation, a split or some other procedure which divides the WIC statement operations into succeeding steps and thus reduces the required assets at each step.

If sufficient assets are found available for the WIC statement, an array of assets is assembled and the statement is mapped thereon (box 75).

Now, a simulation subroutine (Box 76) is accessed and runs an "approximate" simulation of the assembled architectural unit in accordance with the mapped WIC statement. The goal of the simulation (and of subsequent optimizations) is to generate object code which will run at, or greater than a specified fraction of the computer's peak theoretical speed. This is achieved by obtaining an approximate measure of how efficiently each WIC statement executes and then modifying the WIC statement in an attempt to improve its performance. It has been found unnecessary to fully simulate each WIC statement to obtain this result. In effect, therefore, a relatively crude simulation is performed of each WIC statement and such simulation still enables the compiler to arrive at a measure of its execution efficiency.

In real (non-simulated) operation, each WIC statement and code generated therefrom acts upon large arrays of data. The simulation subroutine selects from the large array, a small subset thereof to act as inputs for the subsequent simulation. This prevents the simulator from bogging down as a result of being required to handle greater amounts of data than needed to derive performance criteria that exhibits statistical validity. The data array to be used in the simulation is user specified (or in the absence of a specification, a default subset).

The approximate simulator "executes" for each WIC statement, all called-for memory references. Memory references include all references, whether read or write, to each storage array in memory. In addition, computational actions called for by the WIC statement are simulated, but only in part. For instance, computational actions which pertain to the computing of memory references are simulated. The simulation generally only executes those statements which lead to a subsequent memory reference or any statement which is subjected to a following conditional test.

As an example, consider a reference to an address stored in another part of memory which must be calculated, but is dependent upon an indirect address calculation. In this instance, the address is specified within array A by the value i where i refers to the indirect memory reference. Here, the computation of the value of i is simulated, but not the value of A. This is because A is simply a "result" and the simulation is only concerned with how the computation of A(i) affects the machine's performance and not the result or answer to the calculation. If, however, the value of A is subject to a following conditional test (for instance, is A greater than or less than 1), it will be calculated.

As the simulation program runs (see Box 78, FIG. 7), it records the number of memory references; the number of primitive arithmetic/logic operations performed; and the number of memory conflicts which occur. A primitive arithmetic/logic operation is an add, subtract, multiply, or logical compare. More complex operations are represented by a scaled value of another primitive. For instance, an add operation is equal to 1 whereas a divide operation is equal to 4.

The number of memory conflicts are recorded for each block of memory so as to enable a subsequent reallocation of stored arrays within the memory banks. Other statistics which may be generated by the simulator include cache-misses per plane relative to the number of fetch/restore operations per plane, number of conditional pipeline flushes, and number of reconfigurations as a function of conditional statement executions, etc.

In essence, the simulation is performed not to arrive at final numerical or logical results, but rather to meter the operation of the computer and its allocated assets in the performance of each WIC statement. Thus, the result of the simulation is a set of statistically reliable approximate performance characteristics.

Once the crude simulation of a WIC statement is finished, the algorithm tests (box 80) whether the block or do-loop is finished (i.e., are there any more WIC statements which have not been simulated?). If statements do remain to be simulated, the program recycles to accomplish the simulation. If all WIC statements in a block or do-loop have been simulated, the program proceeds and outputs, among other indications, an operation count for the block or do-loop; an operation count for each WIC statement in the block or do-loop; and a count of memory reference conflicts, including a list of memory banks and conflicts for each (box 82).

As shown in decision box 84 in FIG. 8, those outputs are then compared to pre-defined operating criteria (accessed from the optimization parameters, see box 54 in FIG. 5). If it is found that the do-loop or block of scalar statements executes at an efficiency level greater than the operating criteria, then the WIC statements are converted (box 86) to object code. The program exits if there are no further WIC statements to be processed (decision box 88), otherwise the method recycles to handle the next WIC statement. On the other hand, if the outputs indicate a performance efficiency which is less than the called parameters (decision box 84), it is determined if the performance efficiency has improved over the last "try" (decision box 90). If no performance improvement resulted, the last optimization action is reversed (box 92) and an untried optimization action is attempted. If there was a performance efficiency improvement (box 90), the method proceeds to another untried optimization action (Box 94).

The compiler proceeds with the optimizer subroutine by performing discrete optimization actions on each do-loop or block of scalar WIC code, as the case may be. It performs both code transforms and code heuristics in a serial fashion. For instance, known code transforms are performed, such as the elimination of global common subexpressions, detection and subsequent scalar processing of loopheader operations, etc. The compiler also performs code heuristics which may include, but not be limited to, loop fusions to enable redistribution of unused processing assets, loop interchanging to minimize memory conflicts; dynamic redistribution of data in memory to reduce conflicts; loop splits to allow independent and parallel sub-loop executions etc.

After each discrete optimization action is accomplished (box 94), the revised WIC statements in either the do-loop or block of scalar statements are again simulated using the approximate simulation subroutine. Thus, each do-loop or block of WIC statements has its execution simulated, as above described, to obtain a new set of outputs for comparison to the predefined operating criteria. Then it is determined whether the number of runs of the optimizer routine equals a limit (decision box 96) and, if so, the optimizer routine stops, exits, and the WIC statements are converted to object code. If the run number has not been equaled, the routine cycles back and continues.

As can be seen from the above, the compiler enables the individual do-loops and blocks of scalar statements to be individually tested using a crude simulation. The optimized code statements are subjected to additional optimization subroutines, in an attempt to improve further the code's performance. It will be obvious to one skilled in the art that, subsequent to each optimization subroutine, the recorded internal dependencies of each block and/or do-loop must be reexamined and readjusted in accordance with the altered WIC code statements. This procedure not only optimizes individual blocks of code and do-loops, but also may have global effects on the entire code structure. For instance, if several do-loops are "fused" into a single loop, the dependencies within and among the do-loops are considered and altered, as necessary. Also redistribution or remapping of data has a similar global effect. Thus, a real-time optimization occurs which is tested, at each step, to assure that the object code being produced by the compiler is as optimum as can be produced, based on the code transforms and heuristics employed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for compiling a source code listing into an object code listing, said method performed by a computer with compiler software that controls the operation of said computer, said method comprising the steps of:
   a. extracting a block of source code statements from said source code listing;
   b. mapping each source code statement in said block into a common intermediate code format which defines a dependent series of machine actions to perform function(s) called for by mapped source code statements;
   c. using a subset of an input data array required to enable full operation of said source code listing, executing an approximate simulation of said intermediate code format into which said block of source code statements were mapped in step a, and deriving performance results from said approximate simulation, an approximate simulation generally only executing statements which lead to a subsequent memory reference and any statement which is subjected to a following conditional test;
   d. dependent upon a measure of said performance results, revising said intermediate code format approximately simulated in step c in an attempt to improve said performance results;
   e. repeating steps c and d until a decision point is reached, said decision point occurring upon achievement of a determined condition.

2. The method as recited in claim 1 wherein said intermediate code format includes wide intermediate code (WIC) statements and wherein said revising of said intermediate code format in step d is performed on said WIC statements in accordance with a routine selected from a group of code transforms and heuristics.

3. The method as recited in claim 2 wherein step b comprises the further step of:
   determining dependencies of procedures defined by code within each said WIC statement in said block and subsequently causing said initial approximate simulation to operate in accordance with said dependencies.

4. The method as recited in claim 3 wherein step c further comprises:
   c1. providing a list of architectural parameters that define available processing elements in said computer;
   c2. allocating a set of said available processing elements to implement a WIC statement; and
   c3. operating an approximate simulation routine to process said WIC statement through said allocated processing elements.

5. The method as recited in claim 4 wherein said approximate simulation provides a crude simulation of each WIC statement, said crude simulation including the sub-steps of measuring a number of arithmetic/logic primitive operations, per clock cycle, per WIC statement, a number of memory reference conflicts per WIC statement, and accumulating numbers of said operations and conflicts for each block.

6. The method as recited in claim 5 wherein step d further comprises:
   d1. comparing said performance results against operating criteria for said computer, and performing step e if results of said comparing do not indicate that said results are at least equal to said operating criteria.

7. The method as recited in claim 6 wherein step d further comprises:
   d2. after revising said WIC statements, updating determined dependencies in accordance with revised WIC statements.

8. The method as recited in claim 7 wherein step d further comprises:
   d3. revising memory address allocations for said block of WIC statements in an attempt to reduce memory reference conflicts.

9. The method as recited in claim 8 wherein step d further comprises:
   d4. dividing strings of said primitive operations to enable parallel execution thereof by available processing elements.

10. The method as recited in claim 9 wherein step d further comprises:
    d5. subsequent to revising said WIC statements, assessing whether sufficient non-allocated processing elements are available to implement the revised said WIC statements and if not, revising said WIC statements to utilize available processing elements.

11. The method as recited in claim 10 wherein said decision point in step (e) is a parameter entered by the user.

* * * * *